No. 642,343. Patented Jan. 30, 1900.
A. LEVEDAHL.
ANTIFRICTION BEARING.
(Application filed Apr. 24, 1899.)
(No Model.) 2 Sheets—Sheet 1.
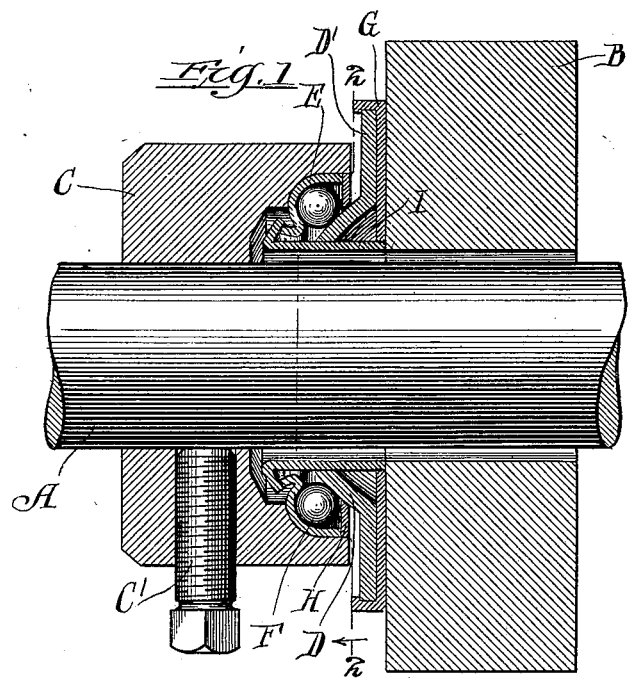
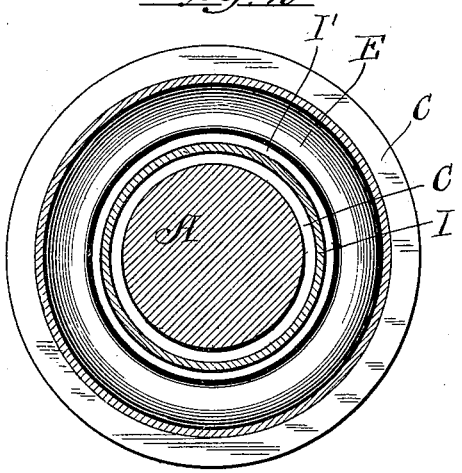 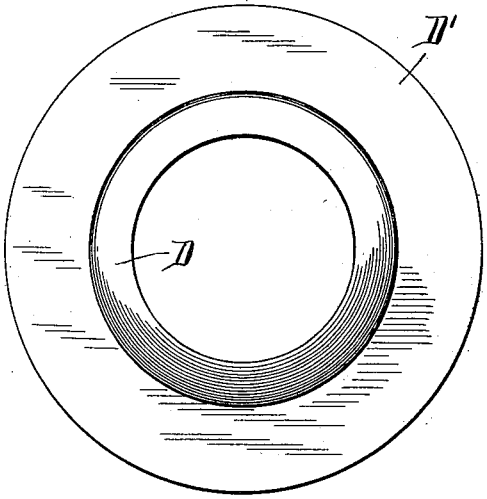
Witnesses
Inventor:
Axel Levedahl
by Poole + Brown his Attys.

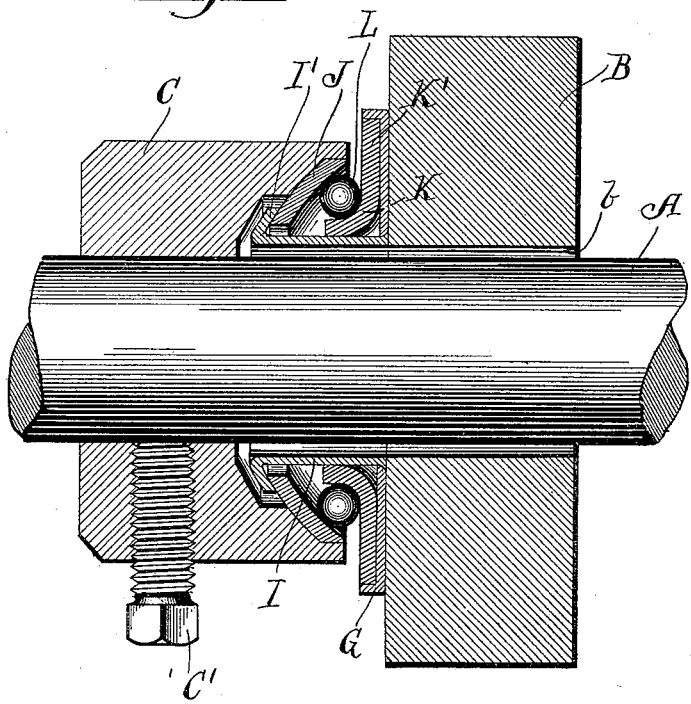

UNITED STATES PATENT OFFICE.

AXEL LEVEDAHL, OF AURORA, ILLINOIS, ASSIGNOR TO THE AURORA AUTOMATIC MACHINERY COMPANY, OF SAME PLACE.

ANTIFRICTION-BEARING.

SPECIFICATION forming part of Letters Patent No. 642,343, dated January 30, 1900.

Application filed April 24, 1899. Serial No. 714,334. (No model.)

*To all whom it may concern:*

Be it known that I, AXEL LEVEDAHL, of Aurora, in the county of Kane and State of Illinois, have invented certain new and useful Improvements in Antifriction-Bearings; and I do hereby declare that the following is a full, clear, and exact description thereof, reference being had to the accompanying drawings, and to the letters of reference marked thereon, which form a part of this specification.

This invention embraces certain improvements in antifriction or roller bearings; and the invention consists in the matters hereinafter set forth, and more particularly pointed out in the appended claims.

In the drawings, Figure 1 is a section of a thrust-bearing made in accordance with my invention, taken longitudinally of a shaft in connection with which the invention is employed. Fig. 2 is a cross-section taken on the indirect line 2 2 of Fig. 1. Fig. 3 is a view of the cone and flange for attaching it in place. Fig. 4 illustrates a modification of the construction shown in Fig. 1.

In Figs. 1 to 4, both inclusive, the invention is shown as applied to a thrust-bearing which is designed to take the end thrust of a rotative part due either to the weight of said part or pressure applied thereto.

As shown in said drawings, A designates a rotative shaft, and B a stationary block adapted to receive the endwise thrust of the shaft. Said stationary block is shown as provided with an opening $b$, which is of greater diameter than the diameter of the shaft, and the block acts to take the end thrust only; but said block may also serve as a support for a plain cylindric or roller bearing by which the shaft is supported. Said shaft is shown as passing through the aperture in the block; but it may terminate short of the block, in which case no opening $b$ will be required. The antifriction-bearing is located between said block and a collar C, which is non-rotatively connected with the shaft—as, for instance, by means of a set-screw C', tapped therethrough and engaging at its inner end the shaft. Said bearing consists, essentially, of two annular bearing members, one bearing against or supported by the block B and the other engaging the collar C, and interposed antifriction-balls, the engaging face of the one of said bearing members—in the instance illustrated the inner one or cone—being made convexly curved. As herein shown, D designates a cone which bears against the supporting-block B and is provided with a central opening through which the shaft passes, E a cup engaging with a collar C and surrounding the shaft, and F F a plurality of antifriction rollers or balls interposed between said cup and cone. Said cup is made with a concave annular bearing-surface for contact with the antifriction-balls F. The annular bearing-surface of the cone has the form of a segment of the sphere. The cone is provided with an annular radial flange D', which affords a suitable bearing-surface for engagement with the block B. In the present instance said cone is provided with a plate G, which is attached in any convenient manner thereto and comes in immediate contact with the adjacent face of the block B. Said plate is shown as being attached to the cone by being folded at its outer margins over the outer margin of the flange of said cone, as shown in Fig. 1. Said plate is mainly useful when the cone and its flange are made of one piece of sheet metal stamped or swaged to form as a means of giving a larger bearing-surface for contact with the part against which the cone rests. In the instance shown said plate is not attached to the block, so that it may be free to shift thereon to adjust the shaft laterally with reference to the block B, the opening $b$ in the block, which is made larger than the shaft, permitting such lateral movement.

The cup E is located in an annular recess or depression on the face of the collar and is adapted to be held therein by frictional engagement with the walls of said recess, being forced therein by pressure, as common in such devices. The parts of the device are so proportioned that when assembled, with the roller-bearings in place, as shown in Fig. 1, the two parts of the bearing may have movement relatively to each other, like the two parts of a ball-and-socket joint, the spherical form of the cone permitting a movement of the cup and balls with respect to the cone about a center of motion corresponding with the center of a spherical surface of which the surface of the cone forms a part or segment. A space will be left between the face of the collar C and the flange D' of the cone, which space permits the slight relative angular movement between the shaft and its support, such as is permitted by the ball-and-socket feature of construction referred to and which may be due to wear of or inaccuracies in the parts.

In order to exclude dust from the bearing, which may enter between the collar C and block B, a flat ring H is inserted into the open end of the recess which receives said cup and is of such width as to extend from the walls of said recess nearly into contact with the cone. The inner margin of said ring is outwardly inclined or beveled to conform to the curvature of the cone. The edge of the cup E is set in from the inner end of the collar a distance equal to the thickness of said ring, so that when said ring is inserted therein its outer surface is flush with the end of said collar.

As a means of preventing access of dust and dirt to the bearing which may enter between the shaft and support a tube I is provided, which surrounds the shaft and is attached conveniently by screw-threads at one end to the plate G and is provided at its other end at the inner side of the cup with an annular flange I', which is located in such close proximity to the inner end of the cup as to form a dust-tight joint between the same. Said block C is recessed at the inner side of the cup to provide room for said flange. Preferably the cone will fit closely upon said tube, which latter affords a support for the inner edge of the cone. The inner surface of said bearing engaged by the inner edge of the cup is curved to correspond with the curvature of the cone, so that said parts will move on each other freely. Said sleeve or tube I when in place, as shown in the drawings, serves to connect the parts of the bearing and prevents relative displacement when removed from the shaft until purposely separated. It is to be understood that when the parts are in place it will seldom be necessary to separate the parts. Said sleeve may therefore serve as a means of connecting all the parts of the device, which may be sold as a complete article of manufacture and ready to be applied to a shaft.

In Fig. 4 I have shown a modified form of bearing in which the concave surface of the cup is spherical. The parts of the bearing in said figure which are like the parts shown in Fig. 1 are designated by the same reference-letters. In said figure, J designates one of the annular bearing members or cup which is attached to the collar C. K designates the other bearing member, and L bearing-balls interposed between said bearing members. The concave or bearing surface of said cup J is spherical. The other bearing member K is also shown as provided with a concave bearing-surface, but may be made of other form, it only being necessary that the space between said cup and the inner edge of the other bearing member be such as to prevent the bearing-balls from dropping inwardly to the inner edge of the cup. Said bearing member K is provided with a laterally-extended flange K', which affords a suitable bearing-surface for engagement with the block B. Said flange directly engages the plate G, which rests in contact with the block, as in the previous construction, which is connected with said flange by being folded over the outer margin thereof. The dust-excluding tube I is in this instance attached to the plate G by being folded over the inner margin thereof, said inner margin of the plate being chamfered to receive the fold or flange of said tube, so as to bring the outer end of the tube flush with the outer face of the plate.

Heretofore it has been a common practice in machine-shops to construct thrust-bearings for rotative shafts by providing the shaft with an annular shoulder either integral therewith or made in the form of a collar adapted to be locked thereto, which shoulder engages a block adapted to receive the endwise thrust of the shaft and has rotative bearing therewith. This arrangement is objectionable because of the loss of power due to friction between the shoulder and support, which latter is usually a rough surface, and also because no provision can be made for relative angular movement between the support and shaft. With my improved bearing, however, there is no loss of power due to friction and the parts may freely adjust themselves to each other, due to the ball-and-socket feature of the construction referred to and to the sliding engagement of the plate G with the support or block B.

So far as the principal feature of my invention is concerned, the part B, which is herein shown as a stationary support, may be a loose or rotative pulley, in which case a similar bearing would be provided on the other side thereof and the pulley would have bearing on the shaft.

A main or principal feature of my invention is embraced in a construction comprising annular bearing members and interposed bearing-balls when the engaging face of one of said bearing members is curved to conform to a segment of a sphere. An important advantage of the construction described is that the shifting of either of the parts of the device to which the bearing is applied out of its correct position or out of axial alinement does not affect the action of the bearing, for the reason that the curvature of the spherical curved bearing member permits relative movement between the same and the other members of the bearing in the manner of a ball-and-socket joint and while maintaining equal pressure on the balls and without tending to bind or wedge the bearing-balls between the annular bearing members. Such construction therefore preserves the integrity of the bearing under relative angular movement of the axes of the parts of the device to which it is attached and enables the bearing to run smoothly if the parts be not originally in exact alinement.

I claim as my invention—

1. An antifriction thrust-bearing comprising two annular bearing members and interposed bearing-balls, one of said members being attached to a shaft and the other having a flat extended bearing-face and being free to move laterally as well as to shift its angular position with respect to the other part attached to the shaft, and the engaging face of one of said members being spherical.

2. An antifriction thrust-bearing comprising two antifriction-bearing members and interposed bearing-balls, one of said members being attached to a shaft and the other having a flat extended bearing-face and being free to move laterally as well as to shift its angular position with respect to the member attached to the shaft.

3. An antifriction thrust-bearing comprising a cone, the engaging face of which is convexedly curved, a cup, and bearing-balls between said cup and cone, said cone being provided with a laterally-extended bearing-flange and being free to move laterally as well as to shift its angular position with reference to the cup.

4. An antifriction-bearing comprising a cone, a cup bearing-balls interposed between the cup and cone, a flange on the cone, a plate attached to said flange and a tube attached to the plate and extending to the inner margin of the cup.

5. An antifriction-bearing comprising a cone, a cup bearing-balls interposed between said cup and cone, a dust-excluding tube attached to the cone and provided at its end adjacent to the cup with a flange having overlapping engagement with the inner margin of said cup.

6. An antifriction-bearing comprising a cone, a cup, bearing-balls interposed between said cup and cone, a flange on the cone, a plate attached to said flange, and a dust-excluding tube having screw-threaded engagement at one end with said plate and having overlapping engagement at its other end with the inner margin of said bearing-cup.

In testimony that I claim the foregoing as my invention I affix my signature, in presence of two witnesses, this 12th day of April, A. D. 1899.

AXEL LEVEDAHL.

Witnesses:
   WILLIAM L. HALL,
   C. A. NEALE.